United States Patent [19]

Radice

[11] Patent Number: 4,705,313
[45] Date of Patent: Nov. 10, 1987

[54] SELECTIVE GRIPPING OF INSIDE AND OUTSIDE OF ARTICLES

[75] Inventor: John G. Radice, Binghamton, N.Y.

[73] Assignee: Universal Instruments Corporation, Binghamton, N.Y.

[21] Appl. No.: 879,949

[22] Filed: Jun. 30, 1986

[51] Int. Cl.[4] .......................... B66C 1/42; B25J 15/04
[52] U.S. Cl. ...................................... 294/94; 294/88; 294/86.4; 294/119.1
[58] Field of Search .................... 294/94, 88, 86.4, 93, 294/96, 103.1, 115, 116, 119.1; 269/32, 34, 256; 901/30, 31, 32, 33, 34, 35, 36, 37, 38, 39; 414/739, 751, 753

[56] References Cited

U.S. PATENT DOCUMENTS 3,170,322  2/1965  Cavanaugh ...................... 294/119.1
4,368,913  1/1983  Brockmann et al. ................. 294/88
4,518,187  5/1985  Blatt et al. ............................ 294/88

Primary Examiner—James B. Marbert
Attorney, Agent, or Firm—Franklin D. Wolffe; Morris Fidelman

[57] ABSTRACT

In a preferred embodiment of the invention, a depending pair of fingers may be caused to grip a component on an inside surface by spreading the fingers apart or to grip the outside surface of a component by closing the fingers upon the component, with the relative orientation of the gripping faces of the fingers depending upon sliding displacement of the tool posts supporting the fingers. The fingers are driven into positive engagement with the surface to be gripped, for both inside and outside gripping, via positive displacement and spreading of cam followers by a cam which, in turn, is displaced by a fluid cylinder. Alternatively, the fingers may be biased into engagement with the surface to be gripped, for both inside and outside gripping, with disengagement of the fingers being provided by positive displacement and spreading of the followers by the cam.

2 Claims, 12 Drawing Figures

SELECTIVE GRIPPING OF INSIDE AND OUTSIDE OF ARTICLES

BACKGROUND AND SUMMARY OF THE INVENTION

The invention is directed generally to a method and apparatus for gripping and handling articles and, more particularly, for a pick and place electrical component handling operation in which odd shaped components may selectively be gripped by engaging the inner or outer surfaces thereof.

It is an object of the instant invention to provide a method and apparatus for grasping and handling components which are not easily grasped by a vacuum spindle.

It is an additional object of the invention to provide for gripping of components on an inside or outisde surface by means of fingers which are cammed via cam followers into positive gripping engagement with the surface, with disengagement of the fingers from the surface being controlled by the cam and followers spring biased into engagement therewith; or, alternatively, to provide that the gripping fingers may have spring biased engagement with the work surface so as to prevent destructive gripping thereof, with positive disengagement from the surface being provided by camming action.

Still further, it is an object of the invention to provide true parallel and level movement of paired tooling so as to avoid the problems inherent in arcuate tool movements.

In a prefered embodiment of the invention, a depending pair of fingers may be caused to grip a component on an inside surface by spreading the fingers apart, or to grip the outside surface of a component by closing the fingers upon the component, with the relative orientation of the gripping faces of the fingers depending upon sliding displacement of the tool posts supporting the fingers. Each tool post is mounted upon a corresponding one of a pair of parallel slides which, in turn, have cam followers attached thereto. By means of a tension spring, the cam followers are urged into engagement with corresponding angled faced of a wedge cam which is reciprocateable between the followres by means of an actuating cylinder. The displacement of the cam, and consequent spreading and closing of the followers as they follow the corresponding surfaces of the cam, controls the selection of inside or outside gripping, as exemplified by engaging faces of the fingers being directed toward each other or away from each other during the gripping. The preferred structural arrangement of such a device provides both inside and outside gripping engagement of the fingers by positive displacement and spreading of the followers when the cam is moved in one direction, and disengagement when the cam is moved in an opposite direction.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE INVENTION

Figure 1:
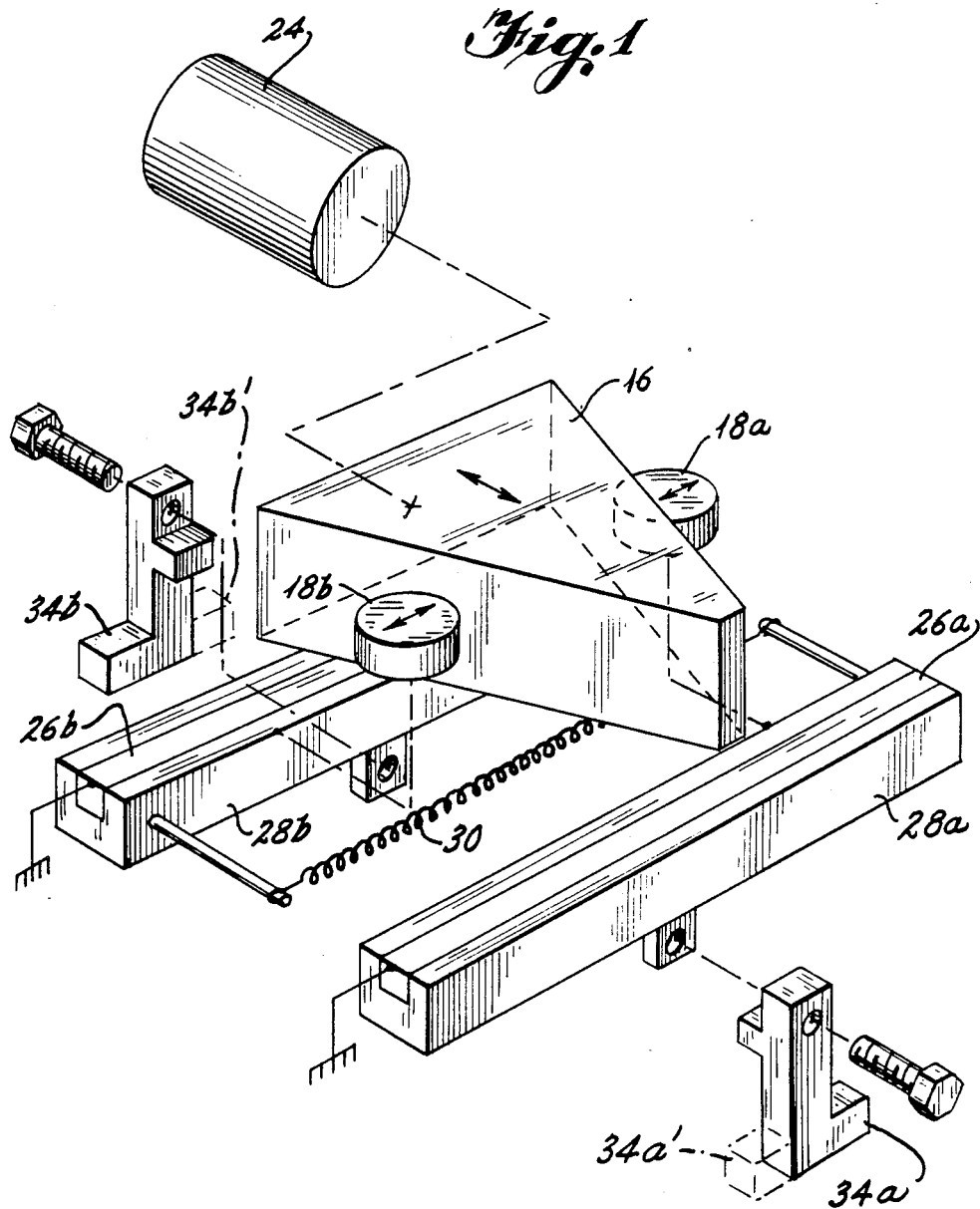
FIG. 1 is a partially exploded isometric view illustrating the interaction of major components of the inventive apparatus.
Figure 9:
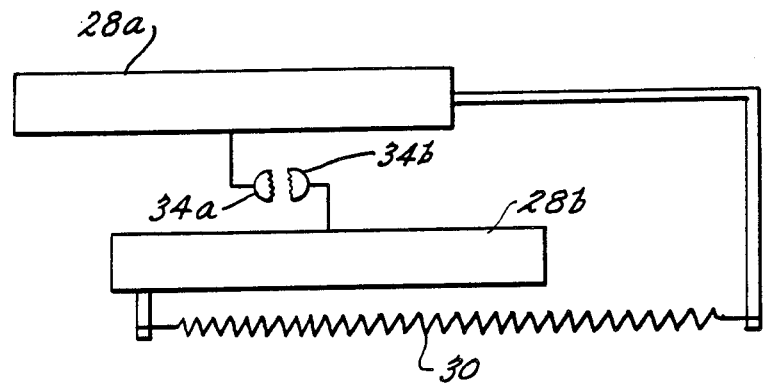
FIGS. 9 and 10 are schematics illustrating, respectively, inside and outside gripping force provided by a cam.
Figure 10:
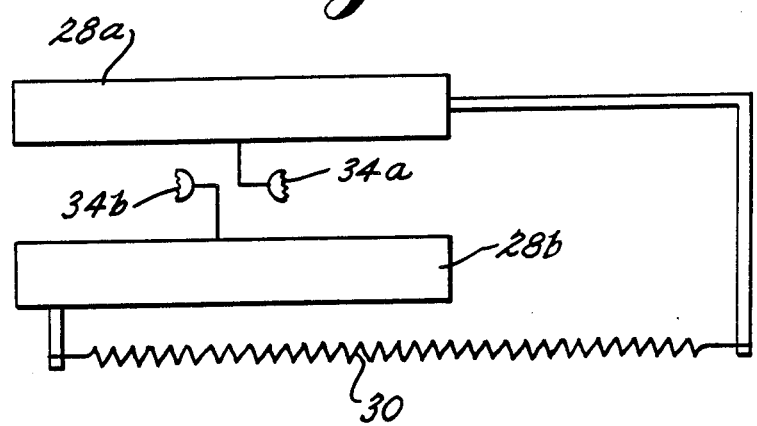

General operation of the invention is best understood by reference to FIGS. 1, 9, and 10, from which it may be seen that a pair of cam followers 18a and 18b are attached to corresponding slides 28a and 28b supported on guides 26a and 26b, with a tension spring 39 urging the followers 18a, 18b into engagement with coresponging surfaces of a wedge cam 16. Interchangeable fingers 34a and 34b are attachable to the slides, as may be appreciated with reference to FIG. 1. As seen in FIGS. 9 and 10, the same fingers may be utilized, respectively, for inside and outside gripping of a component under the influence of cam 16.

Figure 2:
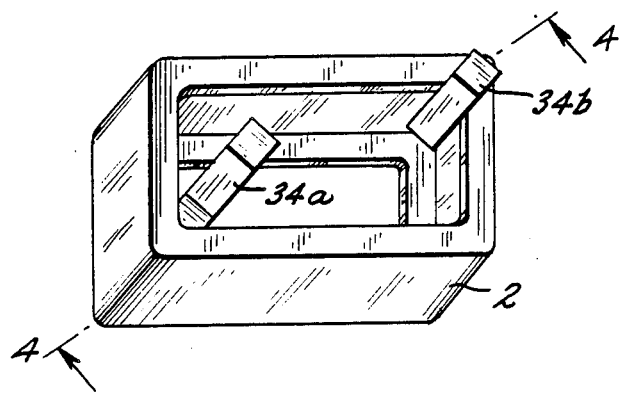
FIG. 2 is an isometric view illustrating an inside grip.
Figure 3:
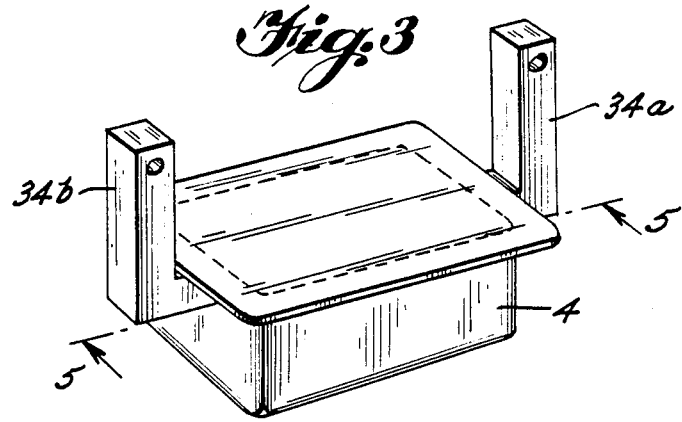
FIG. 3 is an isometric view illustrating an outside grip.
Figure 4:
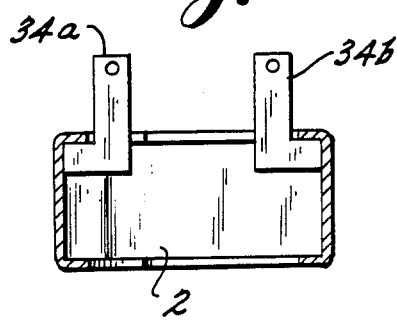
FIG. 4 is a cross-section, as generally viewed in the direction of arrows 4—4 in FIG. 2.
Figure 5:
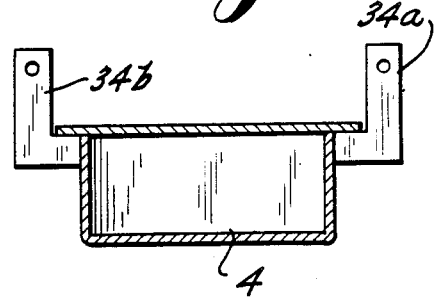
FIG. 5 is a cross-section, as generally viewed in the direction of arrows 5—5 of FIG. 3.

FIGS. 9 and 10 illustrate the fingers as being in line. In order to accomplish such an in-line arrangement of fingers 34a and 34b, it may be necessary to remove one of the fingers in order to switch from inside to outside gripping, or vice versa. However, it is often the case that the fingers do not need to be exactly in line and, as seen in FIGS. 2 and 3, may be offset sufficiently that they may be switched between inside and outside gripping positions by reciprocation of their corresponding slides 28a and 28b relative to each other without removing either of the fingers 34a and 34b.

Although not illustrated as such, the fingers may have work engaging portions on both sides thereof so as to avoid the need for removal of one of the fingers (of the in-line arrangement illustrated in FIGS. 9 and 10) when changing between inside and outside gripping.

Figure 6:
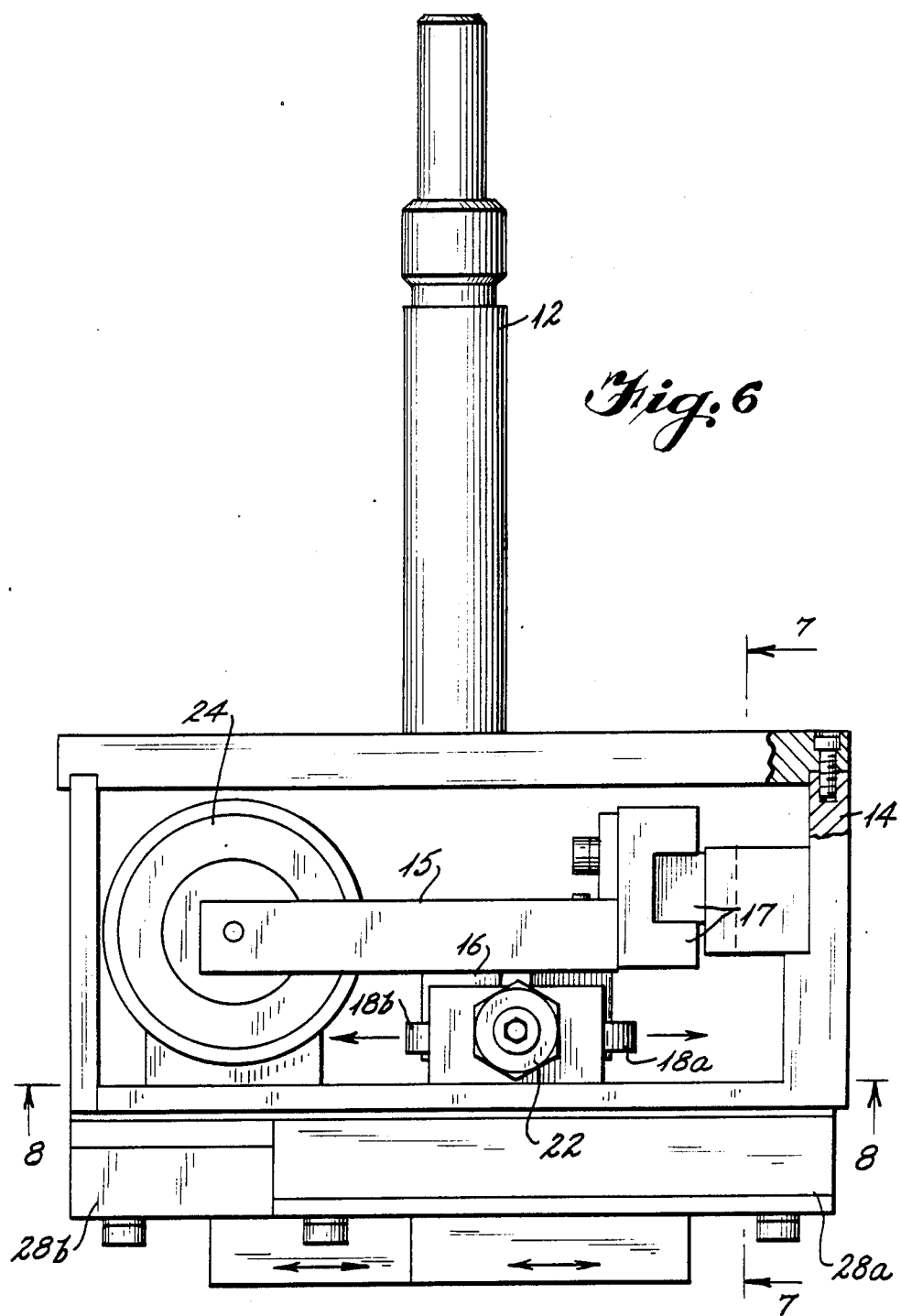
FIG. 6 is an elevational view of the gripper assembly, without the interchangeable gripping fingers.
Figure 7:
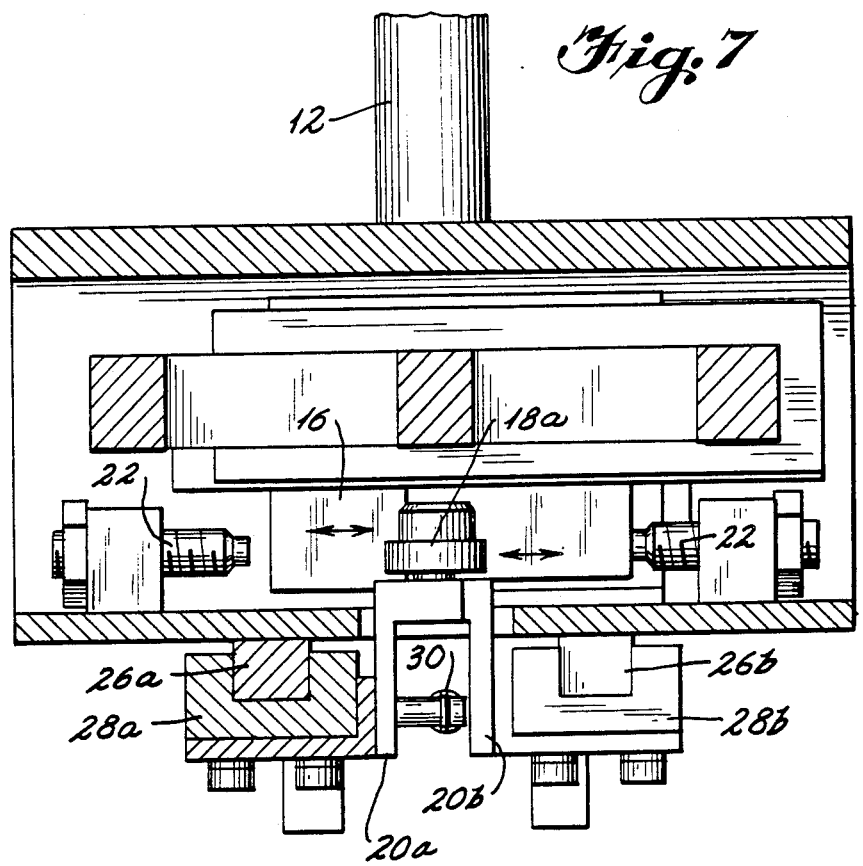
FIG. 7 is a cross-section as generally viewed in the direction of arrows 7—7 of FIG. 6.
Figure 11:
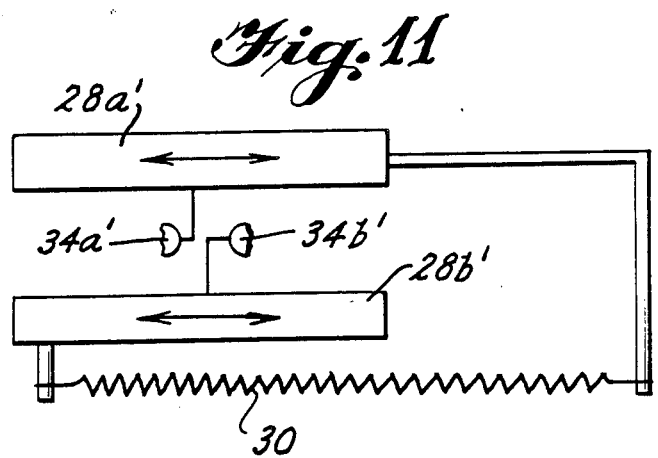
FIGS. 11 and 12 are similar to FIGS. 9 and 10 and illustrate the alternate embodiment of a spring providing a gripping force.
Figure 8:
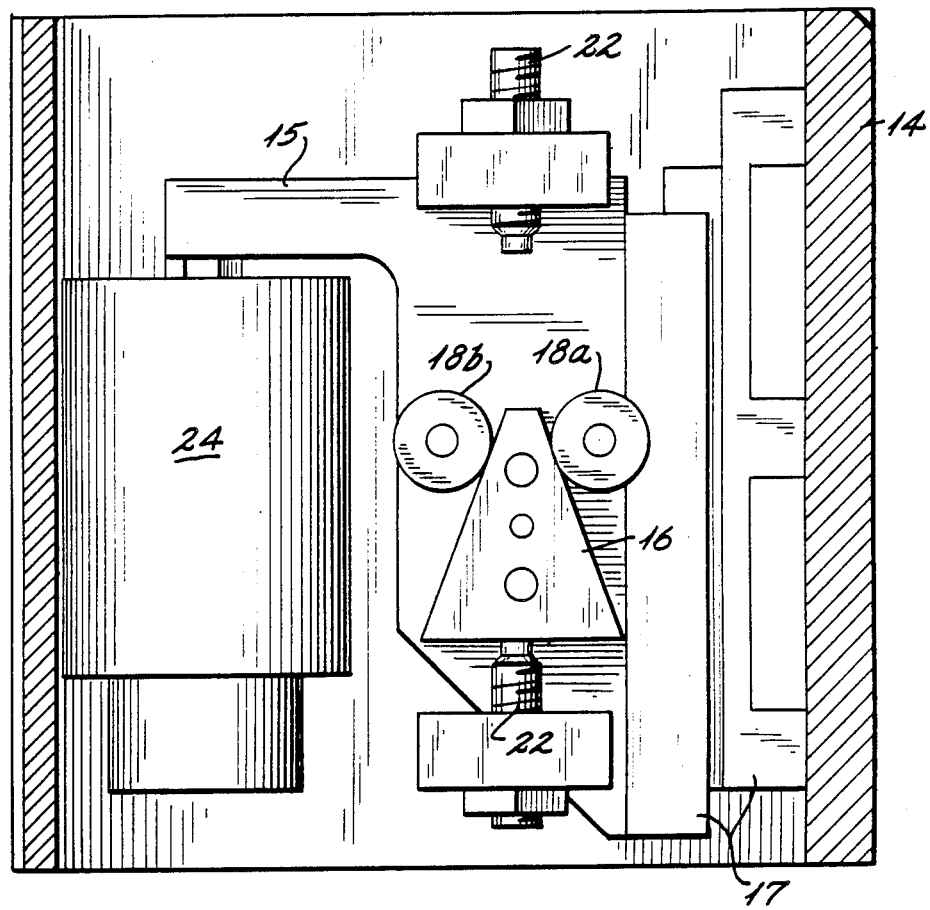
FIG. 8 is a cross-section as generally viewed in the direction of arrows 8—8 of FIG. 6.
Figure 12:
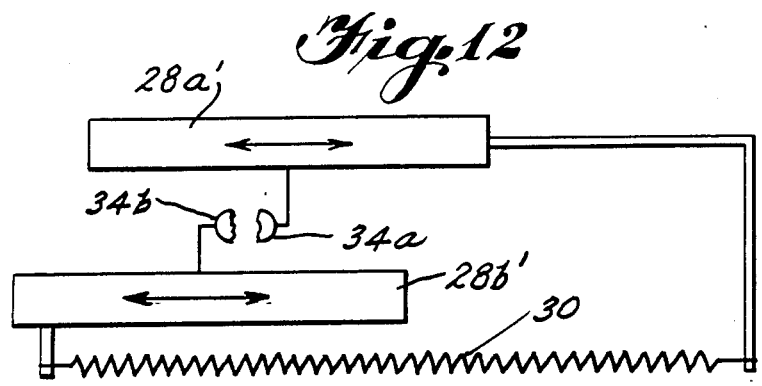

Referring to FIGS. 6-8, cam 16 is mounted upon a support bracket 15 which is attached at one end thereof to actuating cylinder 24 and at the other end thereof to a slide and guide arrangement 17. The extend of travel of the cam may be limited in either or both directions by means of adjustable stops 22, thus avoiding the need for a more expensive actuating cylinder.

As appreciated by reference to FIGS. 2-5, the instant invention is particularly facile in handling components which are not easily adapted to pick and place handling by vacuum spindles, although the instant invention may be utilized to also handle some of those components which are manipulatable by the usual vacuum spindle of a pick and place head.

The assembly illustrated in FIGS. 6–8 may be attached via support shaft 12 to a head assembly which is movable along and rotatable about any or all of the X, Y and Z axes, no mater what the orientation thereof initially, thus providing a universally manipulatable article handler.

Having described the invention, it will be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention hereindescribed, and all statements of the scope of the invention, which as a matter of language, might be said to fall therebetween.

I claim:

1. An apparatus for selectively engaging inner and outer surfaces of components in order to effect gripping thereof, and comprising:

means for spreading gripping fingers apart to engage an inner surface of said component and closing said fingers toward each other to engage an outer surface of said component, selectively, according to respective inside and outside gripping modes, said finger spreading and closing means comprising a displaceable wedge-like cam having said cam surfaces;

means for prepositioning said fingers relative to each other according to one of said gripping modes, said prepositioning means comprising cam followers operatively associated with said fingers and in engagement with cam surfaces of said finger spreading means such that initial positioning of at least one follower and corresponding cam surface distinguishes between said inside and outside gripping modes upon performing said finger moving;

spring means for biasing and retaining said cam followers in engagement with said cam surfaces such that said fingers are positively displaceable into said gripping engagement by displacement of said cam;

means for positioning said fingers relative to said component, after said prepositioning, in order to effect said gripping mode selected; and means for moving said fingers into engagement with a component surface according to said gripping mode selected in order to effect said gripping.

2. An apparatus for selectively engaging inner and outer surfaces of components in order to effect gripping thereof, and comprising:

means for spreading gripping fingers apart to engage an inner surface of said component and closing said fingers toward each other to engage an outer surface of said component, selectively, according to respective inside and outside gripping modes;

means for prepositioning said fingers relative to each other according to one of said gripping modes;

means for positioning said fingers relative to said component, after said prepositioning, in order to effect said gripping mode selected;

means for moving said fingers into engagement with a component surface according to said gripping mode selected in order to effect said gripping;

means for spring biasing said fingers into said gripping engagement; and means for controlling said spring biasing and positively disengaging said fingers from said surface, said controlling means comprising cam surfaces and corresponding cam surface followers, each of said followers being operatively associated with a corresponding one of said fingers, said spring biasing urging said followers into engagement with said cam surface.

* * * * *